2,906,159

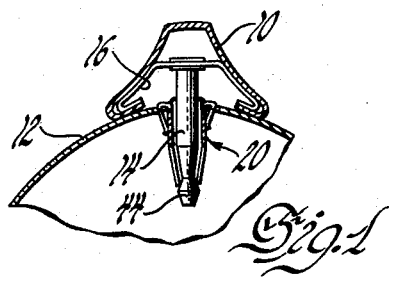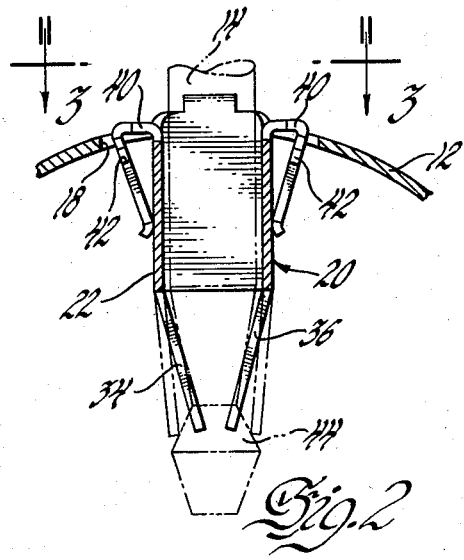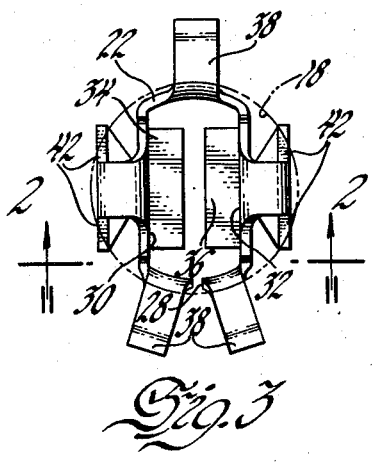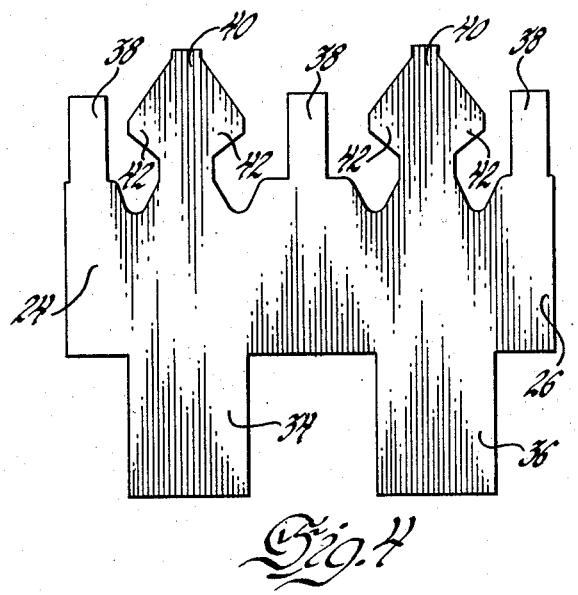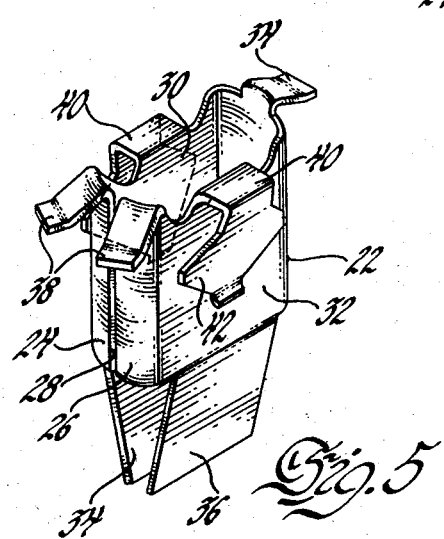

THREADLESS STUD RETAINER HAVING A PLURALITY OF LUGS TO ENGAGE WORK SURFACE

Engelbert A. Meyer, Detroit, Mich., assignor to General Motors Corporation, Detroit, Mich., a corporation of Delaware Application September 17, 1956, Serial No. 610,273

6 Claims. (Cl. 85—36)

This invention relates to fasteners in general and more particularly to stud retaining fastener clips formed from a sheet metal stamping.

It is here proposed to provide a new and improved fastener clip for retaining stud members within receiving apertures. The proposed fastener is particularly adapted for use with ornamental moldings and the like such as are applied to the surface of automotive vehicle bodies.

In the drawings:

Figure 1 is a cross-sectioned view of a vehicle fender having a fender crown molding strip retained thereto by the proposed fastener clip.

Figure 2 is an enlargement of that part of Figure 1 showing the proposed fastener and is a cross-sectional view of the clip taken in the plane of line 2—2 of Figure 3.

Figure 3 is a top view of the proposed stud retaining fastener clip as seen in the plane of line 3—3 of Figure 2.

Figure 4 is a view of the sheet metal stamping from which the proposed fastener clip is formed.

Figure 5 is a perspective view of the proposed fastener clip.

The stud retaining fastener clip of Figure 1 is shown adapted for use in retaining an ornamental molding 10 upon the crown of a vehicle fender 12. The molding member han a stud 14 retained thereto by clip means 16. A circular opening 18 is formed through the fender crown to receive the proposed stud retaining fastener clip 20; which in turn is to receive and retain the stud member 14 thereto.

The fastener clip 20 is formed from a sheet metal blank stamped to the form show by Figure 4. The blank is formed to provide a clip having a body portion 22 generally rectangular in shape and complementary to the opening 18 formed in the supporting fender wall and adapted to receive the clip therein. The ends 24 and 26 of the blank are disposed in spaced planar relation to provide a gap 28 which allows for the contraction and expansion of the body portion during its assembly within the opening 18 of the receiving wall 12.

The body portion 22 includes oppositely disposed straight side walls 30 and 32, forming the longer sides of the rectangular body portion, having depending and inwardly inclined tabs 34 and 36 formed from the lower ends thereof with their terminal ends in parallel spaced relation for engaging and retaining the stud 14 therebetween.

Tabs 38 are formed from the upper end of the body portion 22 and are bent outwardly and downwardly to provide spring fingers for engaging the upper surface of the wall 12 about the opening 18 to prevent the clip from passing therethrough.

Tabs 40 are formed from the upper ends of the side walls 30 and 32 and are bent back upon themselves to engage their respective side walls. Shoulder portions 42 are provided on each side of each tab in planar relation therewith and extend outwardly beyond the limits of the clip receiving opening 18 provided in the supporting wall in order to engage the underside of such wall. The upper shoulder portion is inclined outwardly and downwardly and serves to engage the lower surface of the supporting wall while the bottom shoulder portions are inclined outwardly and upwardly to serve as a cam to facilitate assembly of the clip through the receiving opening.

The fastener clip 20 is assembled within the opening 18 of the receiving wall 12 by being inserted through the opening until the tabs 38 engage the supporting wall and the shoulder portions 42 of the tabs 40 have passed through the opening and are engaged with the underside of the supporting wall. The stud member 14 is then extended through the body portion 22 of the clip until the headed end 44 thereof is engaged by the inwardly disposed tabs 34 and 36. The parallel spaced relation of the stud engaging tabs extending across the clip enables the stud to be engaged thereto despite incidental misalignment of the stud relative to the true center of the receiving opening.

I claim:

1. A stud retaining fastener clip formed from a stamped blank to include a body portion of generally rectangular cross section adapted to be received within a generally circular opening provided in a supporting wall, oppositely disposed relatively flat depending spring tabs formed on the ends of opposite side walls of said body portion and formed to converge toward each other and extending substantially across said body portion for engaging a stud member received through said body portion in either angular or concentric relation with respect to said body portion, outwardly and downwardly extending resilient tabs formed from the upper ends of said body portion for engaging said upper side of said supporting wall, a pair of resilient tabs formed on the wider side walls of said body portion being reversely bent and receivable between said wider side walls and the edge of said opening and having upwardly facing shoulders extended laterally outwardly beyond the limits of said opening for engagement with the underside of said supporting walls, the portions of said last mentioned tabs comprising said portions being spaced from said wider side walls, and said clip being rotatable in said opening and adapted to receive said stud in different positions between the smaller end walls thereof for more readily aligning said clip with said stud received thereby.

2. A stud retaining a fastener clip formed from a stamped blank to include a body portion of generally rectangular cross section adapted to be received within a generally circular opening provided in a supporting wall, oppositely disposed depending spring tabs formed on the ends of opposite side wall of said body portion and formed to converge toward each other and extending substantially across said body portion and terminating in straight parallel ends for engaging a stud member received through said body portion in either angular or concentric relation with respect to said body portion, outwardly and downwardly extending resilient tabs formed from the upper ends of said body portion for engaging said upper side of said supporting walls, a pair of resilient tabs formed on the wider side walls of said body portion being reversely bent and receivable between said wider side walls and the edge of said opening and having upwardly facing shoulders extended laterally outwardly beyond the limits of said opening for engagement with the underside of said supporting walls, the portions of said last mentioned tabs comprising said portions being spaced from said wider side walls, and said clip being rotatable in said opening and adapted to receive said stud in different positions between the smaller end walls thereof for more readily aligning said clip with said stud received thereby.

3. A stud retaining fastener clip as described in claim 1 wherein said pair of resilient tabs are inclined downwardly and inwardly.

4. A stud retaining fastener clip as described in claim 1 wherein said upwardly facing shoulders are inclined outwardly and downwardly.

5. A stud retaining fastener clip as described in claim 1 wherein said pair of resilient tabs have downwardly facing shoulders inclined inwardly and downwardly.

6. A stud retaining fastener clip as described in claim 1 wherein the ends of said blank are spaced apart to allow for contraction of said body portion in the assembly of said clip within said supporting wall opening.

References Cited in the file of this patent

UNITED STATES PATENTS

| | | |
|---|---|---|
| 2,198,186 | Tinnerman | Apr. 23, 1940 |
| 2,244,975 | Tinnerman | June 10, 1941 |
| 2,610,377 | Bedford | Sept. 16, 1952 |